(12) United States Patent
Nishimura et al.

(10) Patent No.: US 6,754,417 B2
(45) Date of Patent: Jun. 22, 2004

(54) OPTICAL FIBER TAP CAPABLE OF RANDOM PLACEMENT ALONG AN OPTICAL FIBER

(75) Inventors: Ken A. Nishimura, Fremont, CA (US); Ian Hardcastle, Sunnyvale, CA (US); Jonathan N. Simon, Castro Valley, CA (US); Gary B. Gordon, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 147 days.

(21) Appl. No.: 10/133,818

(22) Filed: Apr. 24, 2002

(65) Prior Publication Data

US 2003/0202747 A1 Oct. 30, 2003

(51) Int. Cl.[7] ................................................. G02B 6/26
(52) U.S. Cl. ............................ 385/48; 385/27; 385/30; 385/32
(58) Field of Search .............................. 385/27, 30, 32, 385/48

(56) References Cited

U.S. PATENT DOCUMENTS

| | | | | |
|---|---|---|---|---|
| 4,558,920 A | * | 12/1985 | Newton et al. ............... | 385/30 |
| 4,747,652 A | * | 5/1988 | Campbell et al. ............. | 385/32 |
| 4,810,052 A | * | 3/1989 | Fling ............................. | 385/44 |
| 4,889,403 A | * | 12/1989 | Zucker et al. ................. | 385/32 |
| 4,934,777 A | * | 6/1990 | Jou et al. ....................... | 385/27 |
| 5,903,691 A | * | 5/1999 | Wisseman et al. ............ | 385/37 |
| 6,130,899 A | * | 10/2000 | Epworth et al. ............... | 372/6 |

* cited by examiner

Primary Examiner—Ellen E. Kim
(74) Attorney, Agent, or Firm—Ian Hardcastle

(57) ABSTRACT

The optical fiber tap establishes optical communication between a branch optical fiber and a main optical fiber and includes a housing, a serpentine main channel and a branch channel. The main channel is defined in the housing and is shaped to accommodate part of the main optical fiber. The main channel includes a coupling curve portion shaped to define a main coupling curve in the main optical fiber. The branch channel is also defined in the housing and is shaped to accommodate part of the branch optical fiber. The branch channel communicates with the main channel at the coupling curve portion of the main channel. Optical signals couple laterally between the main optical fiber located in the main channel and the branch optical fiber located in the branch channel. Optical communication between the optical fibers is therefore established.

25 Claims, 9 Drawing Sheets

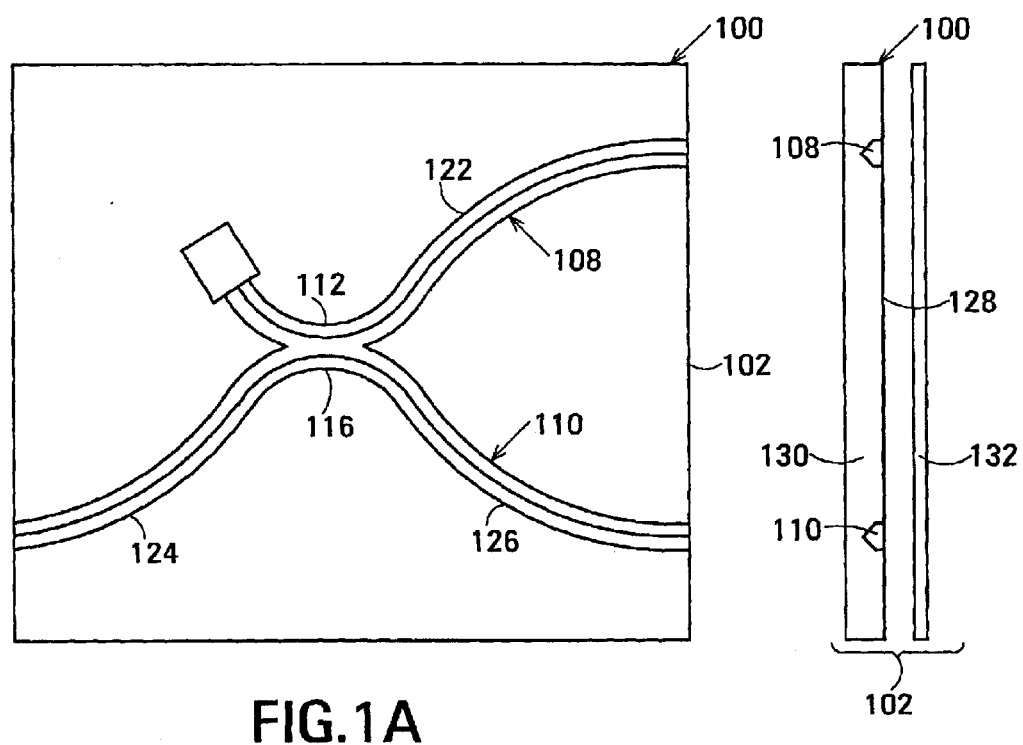
FIG.1A
FIG.1B
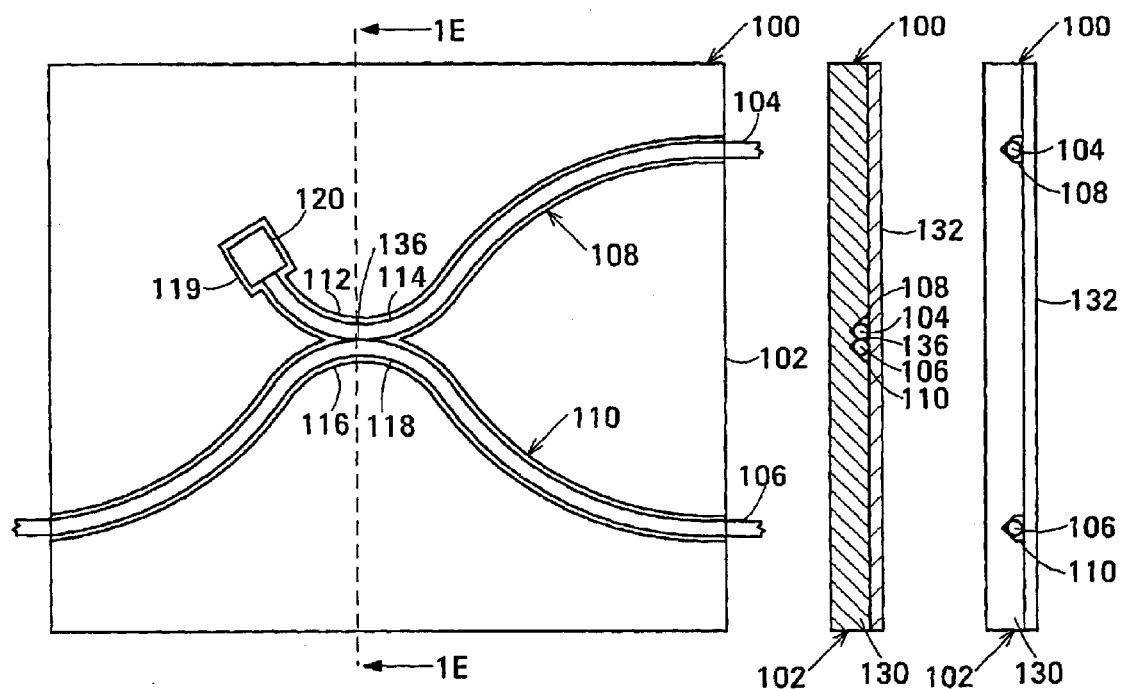
FIG.1C
FIG. 1E
FIG. 1D

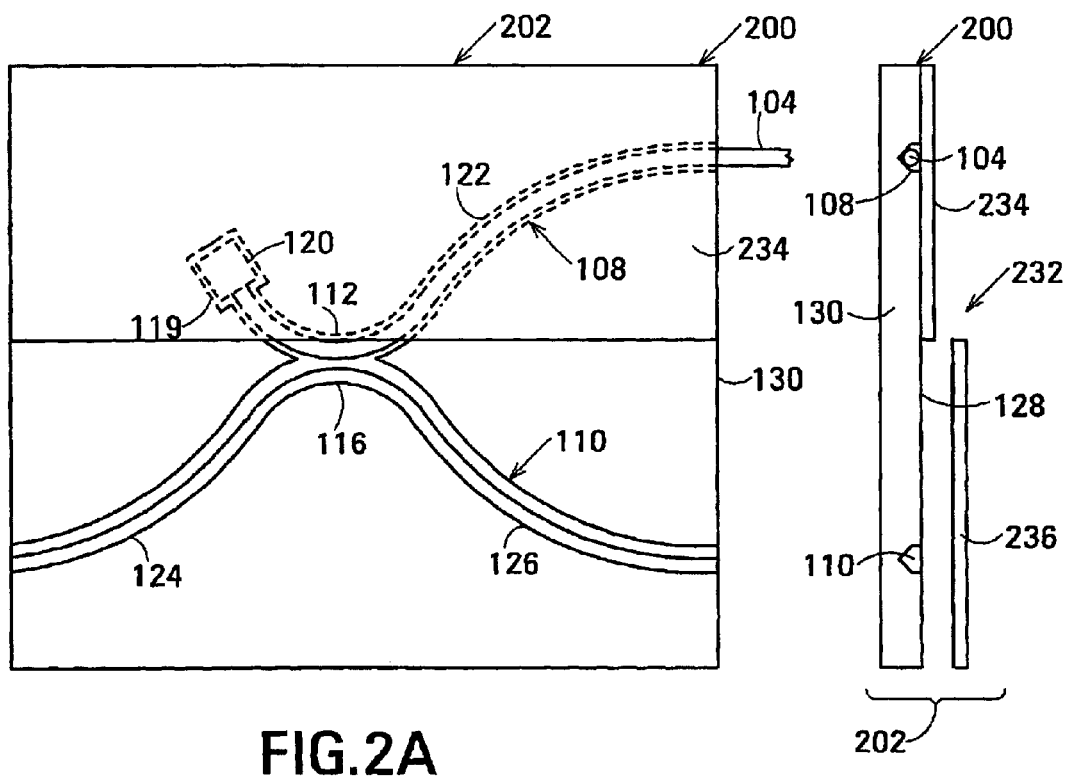
FIG.2A
FIG.2B
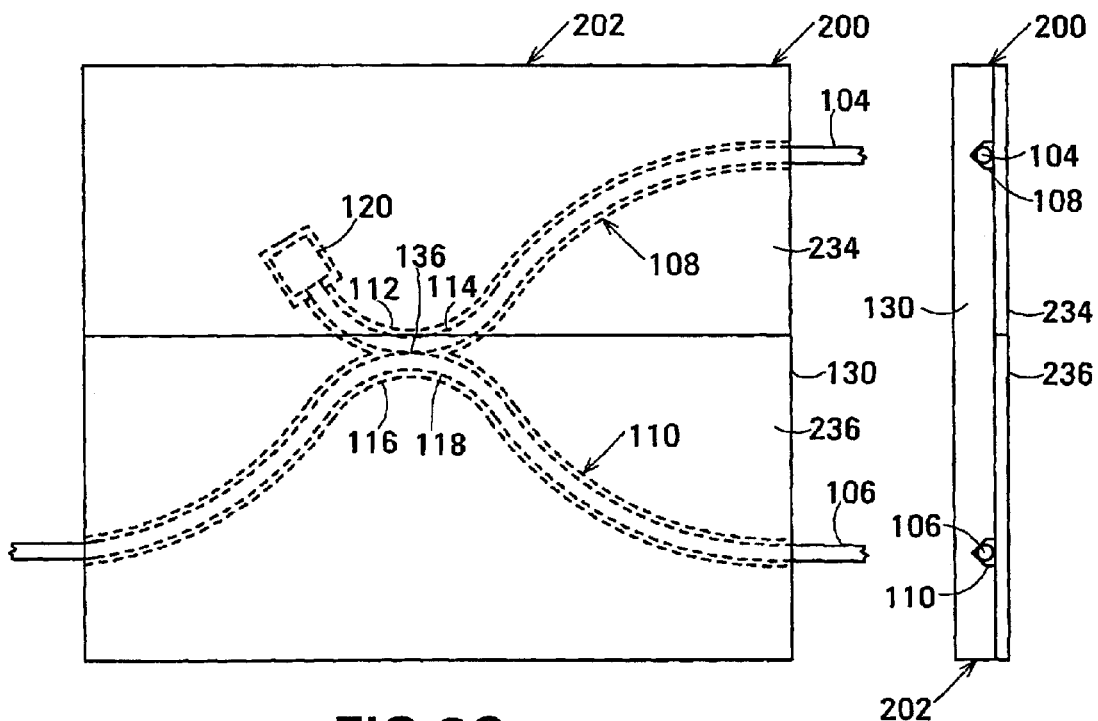
FIG.2C
FIG.2D

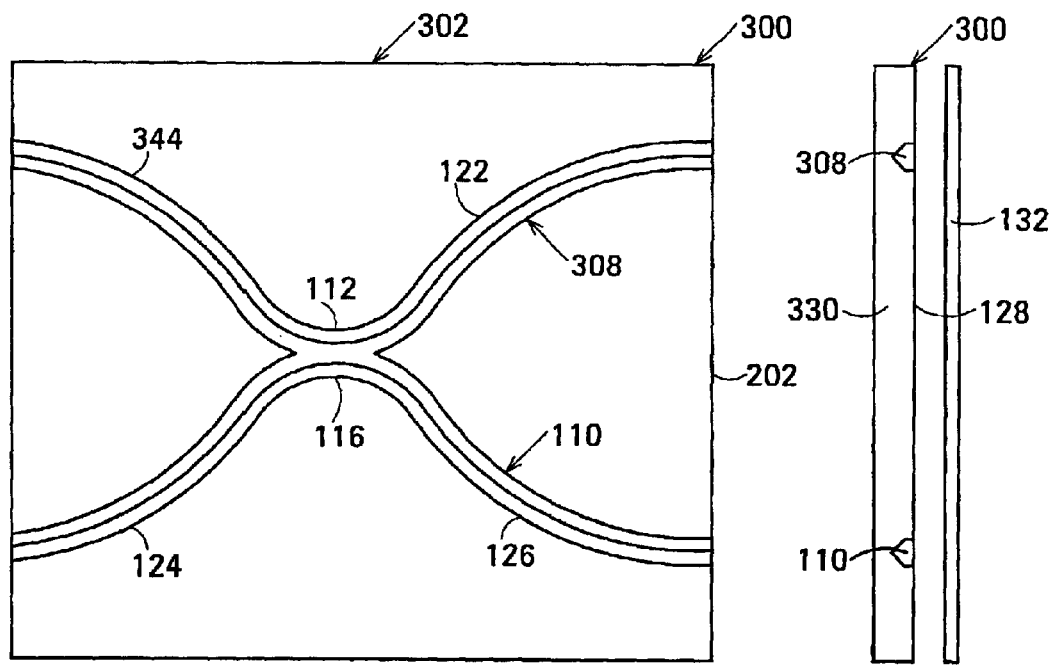
FIG.3A
FIG.3B
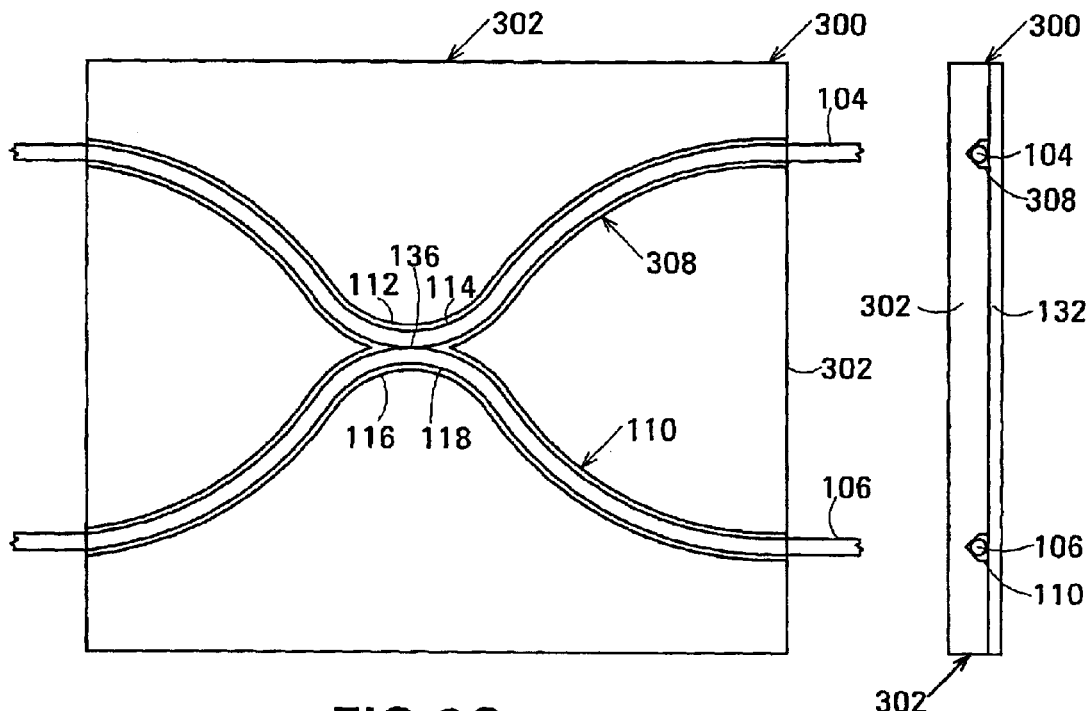
FIG.3C
FIG.3D

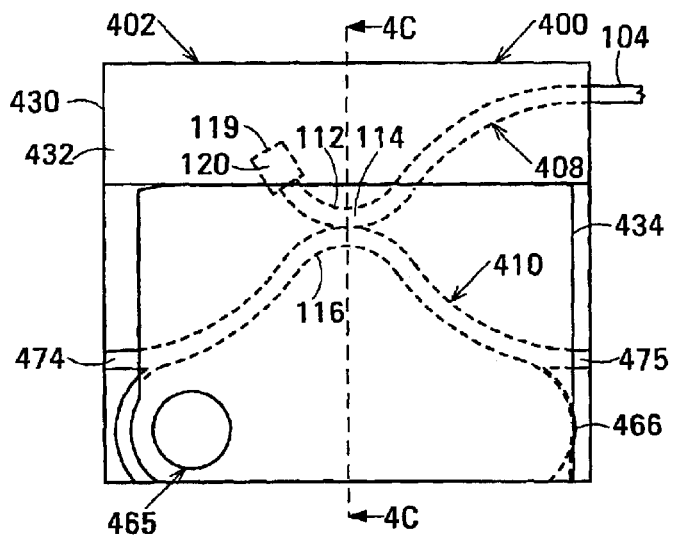
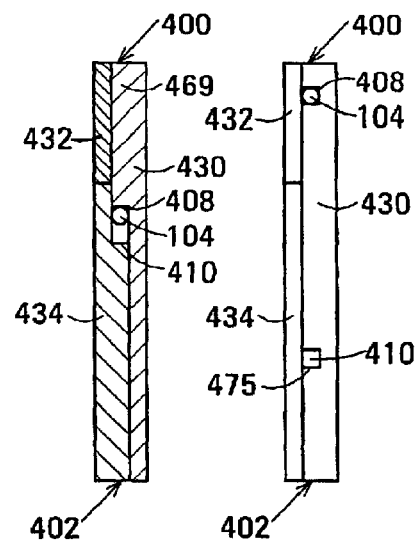
FIG.4A  FIG.4C FIG.4B
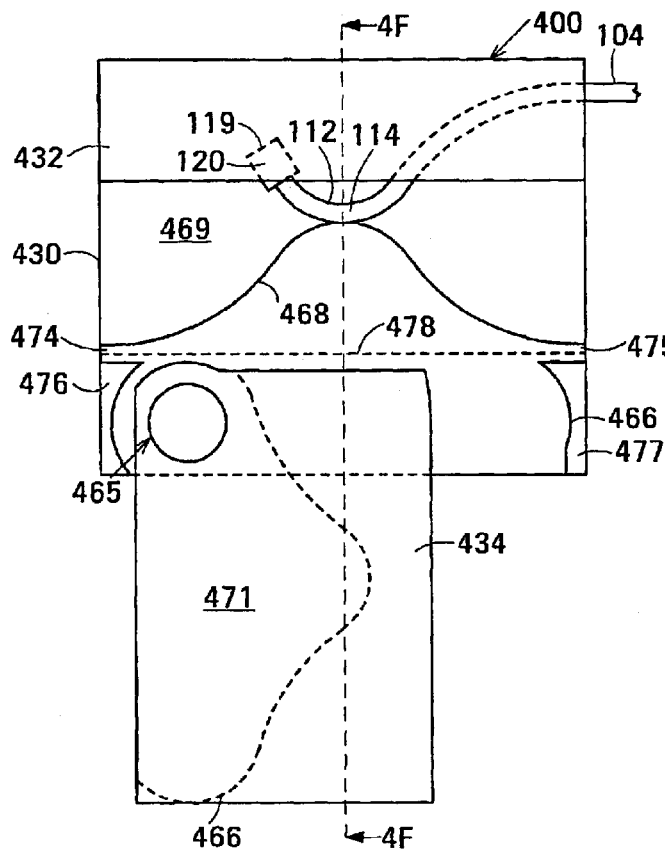
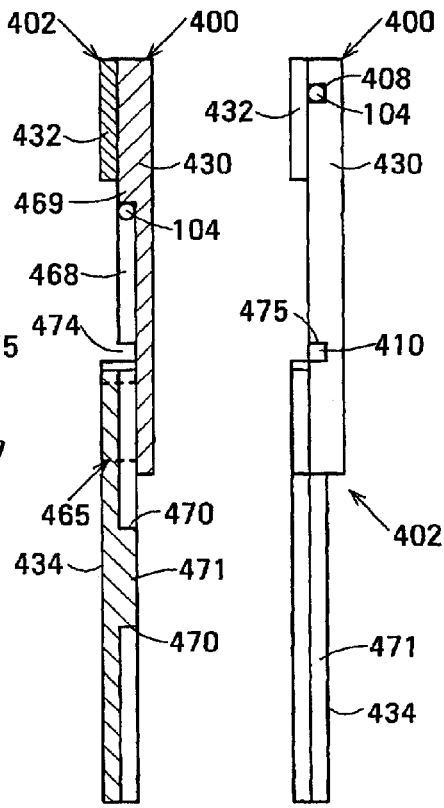
FIG.4D  FIG.4F FIG.4E

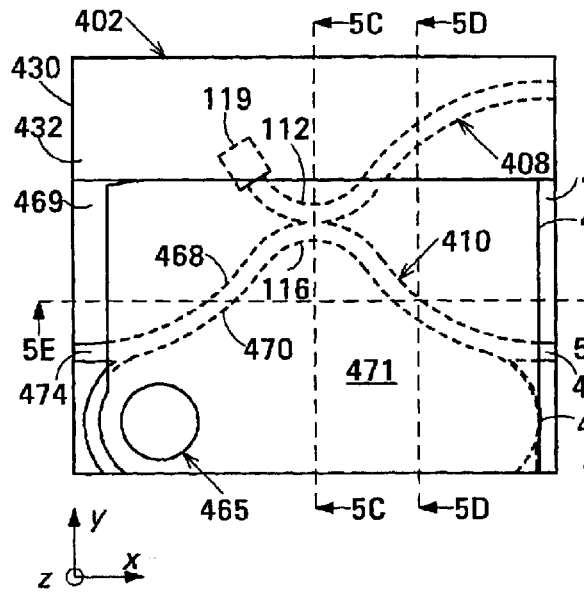
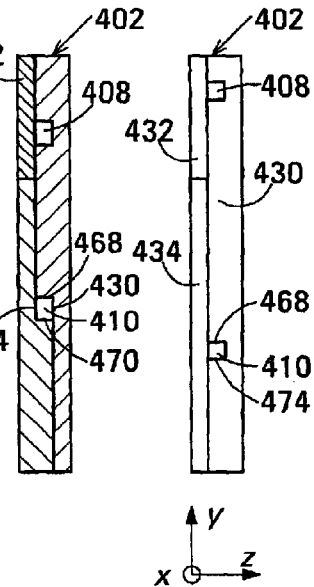
FIG.5A  FIG. 5C  FIG. 5D  FIG. 5B
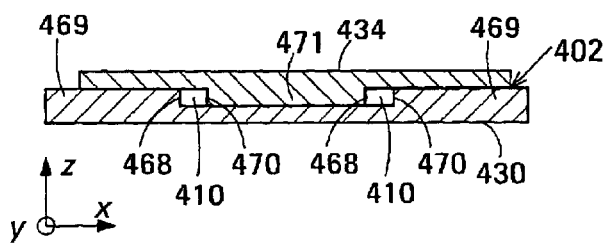
FIG.5E

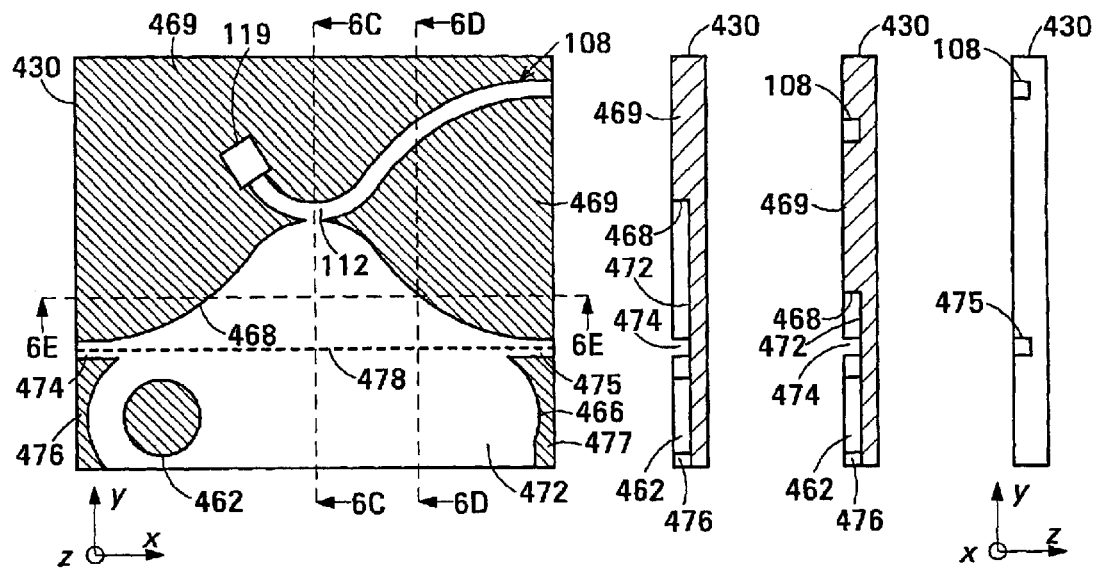
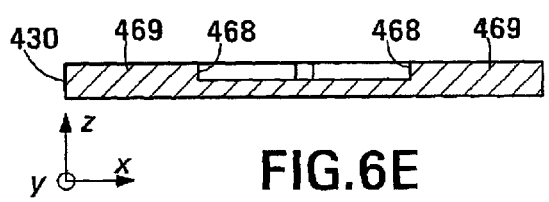
FIG.6A / FIG.6C / FIG.6D / FIG.6B / FIG.6E
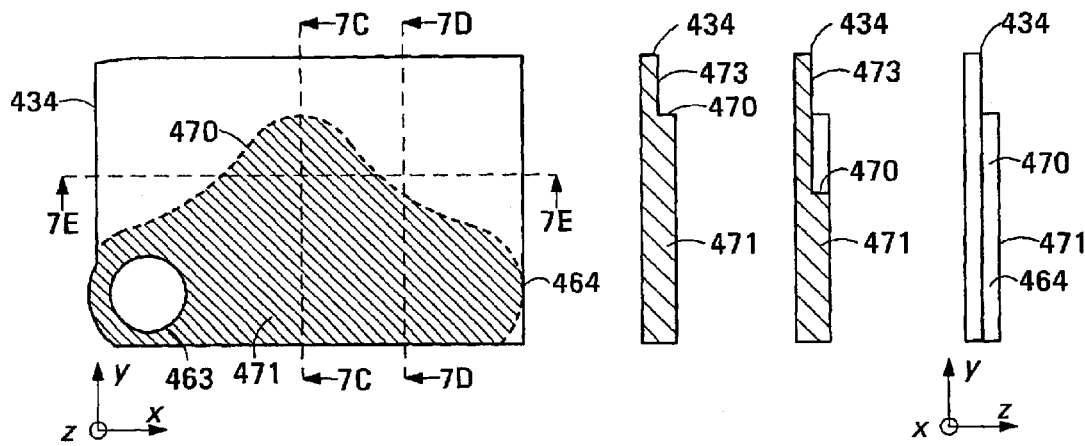
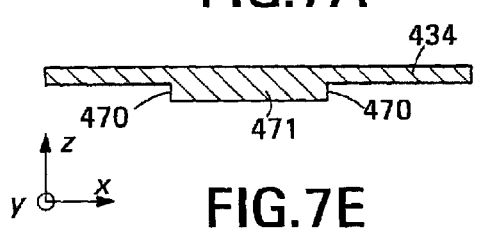
FIG.7A / FIG.7C / FIG.7D / FIG.7B / FIG.7E

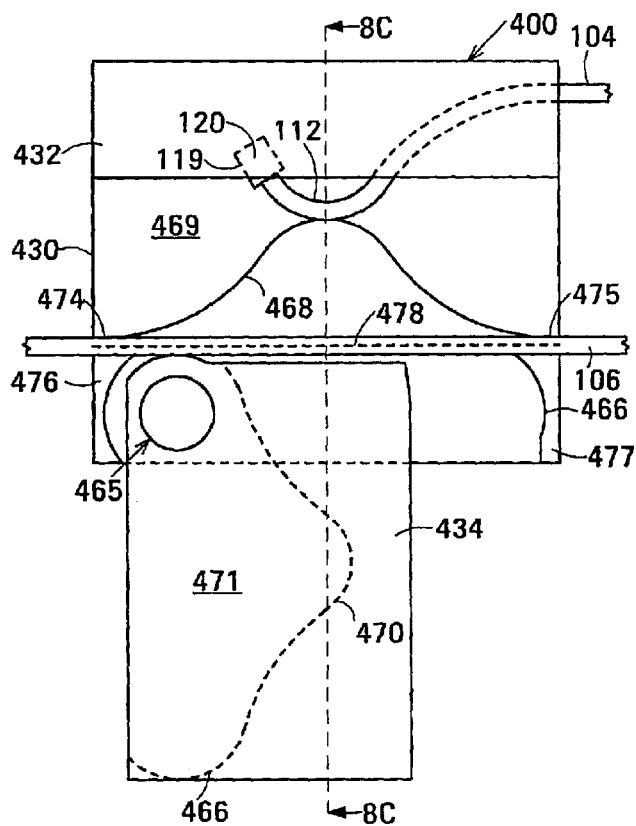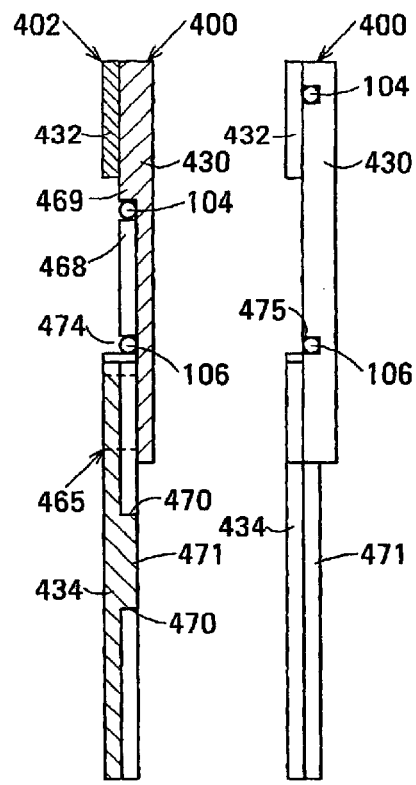
FIG.8A   FIG.8C FIG.8B
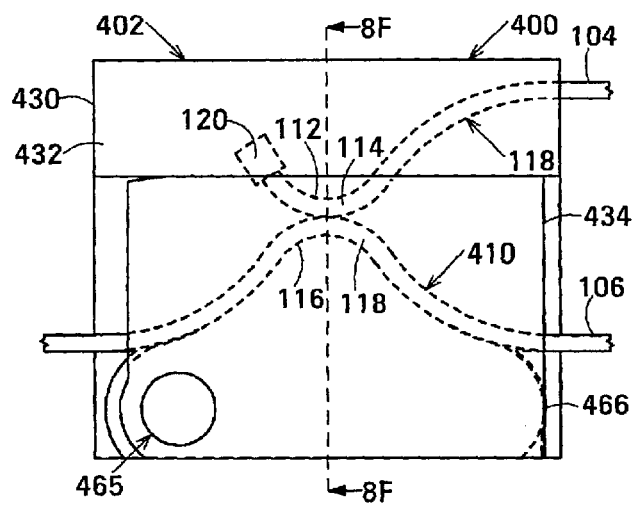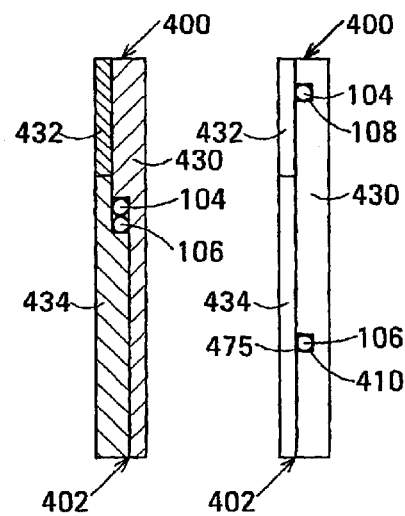
FIG.8D   FIG.8F FIG.8E

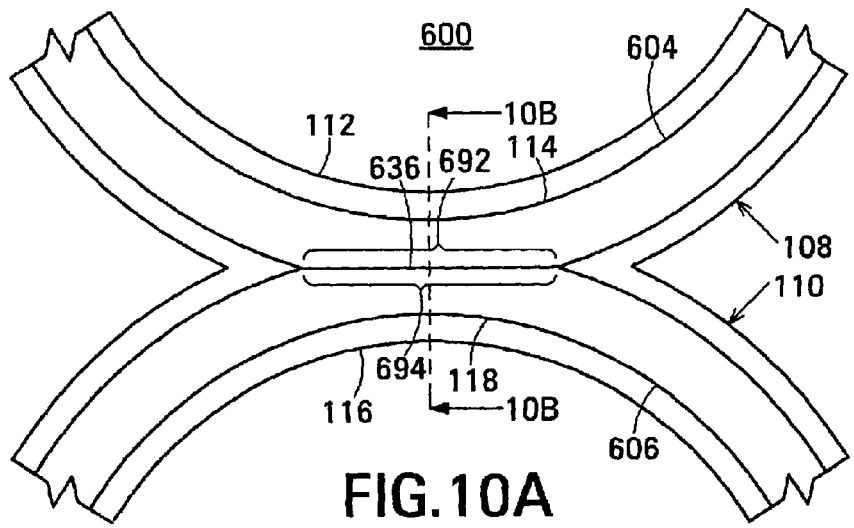 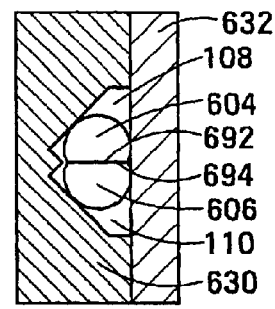
FIG.10A  FIG.10B
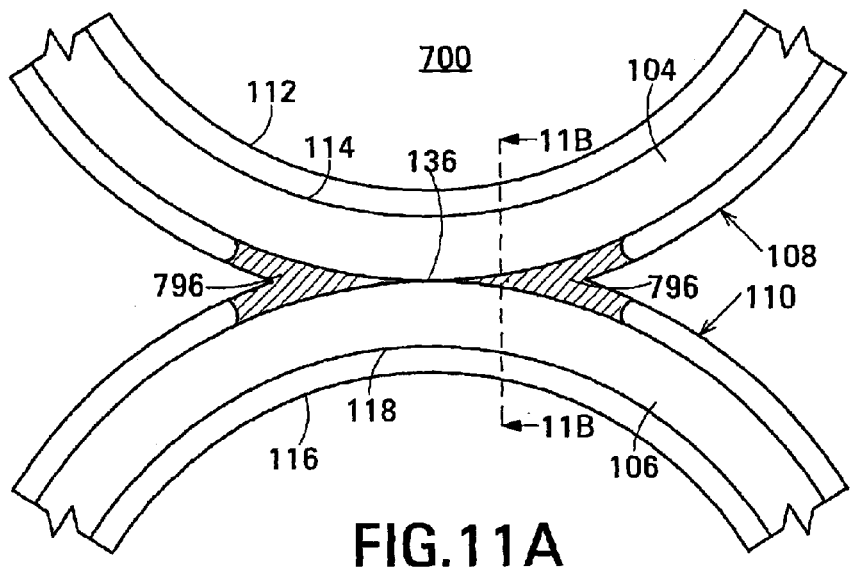 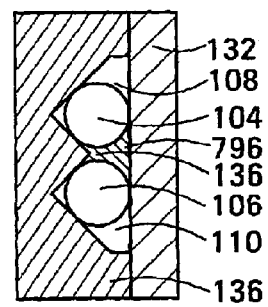
FIG.11A  FIG.11B

OPTICAL FIBER TAP CAPABLE OF RANDOM PLACEMENT ALONG AN OPTICAL FIBER

BACKGROUND OF THE INVENTION

Optical fibers are often used to transmit optical signals between optical elements. Sometimes it is desirable to add an optical signal received from an optical device via a branch optical fiber to a main optical fiber, or to extract a sample of the optical signal passing through the main optical fiber and to transmit the sample to another optical device via the branch optical fiber. For example, the main optical fiber may distribute an optical network signal to subscribers located along a city street. When new customers subscribe to the network service, additional signal connections may need to be made to the main optical fiber.

Establishing such additional signal connections has conventionally required that the main optical fiber be severed. This process may be time-consuming, results in an interruption of the signal transmission through the main optical fiber and reduces the reliability of the optical main fiber.

Thus, what is needed is an optical fiber tap that enables a branch optical fiber to be coupled to a main optical fiber at any point along the main optical fiber to enable an additional signal connection to be made without severing the main optical fiber.

SUMMARY OF THE INVENTION

The invention provides an optical fiber tap for establishing optical communication between a branch optical fiber and a main optical fiber. The optical fiber tap is capable of random placement along the main optical fiber. The optical fiber tap includes a housing, a serpentine main channel and a branch channel. The main channel is defined in the housing and is shaped to accommodate part of the main optical fiber. The main channel includes a coupling curve portion shaped to define a main coupling curve in the main optical fiber. The branch channel is also defined in the housing and is shaped to accommodate part of the branch optical fiber. The branch channel communicates with the main channel at the coupling curve portion of the main channel. Optical signals couple laterally between the main optical fiber located in the main channel and the branch optical fiber located in the branch channel. Optical communication between the optical fibers is therefore established.

In one embodiment, the branch channel is serpentine and includes a coupling curve portion opposed to and juxtaposed with the coupling curve portion of the main channel. Optical signals couple laterally between the juxtaposed, opposed coupling curves formed by the main channel in the main optical fiber and by the branch channel in the branch optical fiber. Optical communication is therefore established between the optical fibers.

In another embodiment, the branch channel includes an end-stop located adjacent the coupling curve portion of the main channel. The end-stop locates one end of the branch optical fiber at the coupling curve portion of the main channel. Optical signals couple laterally between the coupling curve formed by the main channel in the main optical fiber and the end of the branch optical fiber. Optical communication is therefore established between the optical fibers.

BRIEF DESCRIPTION OF THE DRAWINGS

FIGS. 1A and 1B are respectively a top view and a side view of a first embodiment of an optical fiber tap according to the invention.

FIGS. 1C and 1D are respectively a top view and a side view of the optical fiber tap shown in FIGS. 1A and 1B with the branch optical fiber and the main optical fiber installed in the branch channel and the main channel, respectively.

FIG. 1E is a cross-sectional view along the line 1E—1E in FIG. 1C of the optical fiber tap shown in FIGS. 1C and 1D.

FIGS. 2A and 2B are respectively a top view and a side view of a second embodiment of an optical fiber tap according to the invention.

FIGS. 2C and 2D are respectively a top view and a side view of the optical fiber tap shown in FIGS. 2A and 2B with the main optical fiber additionally installed in the main channel.

FIGS. 3A and 3B are respectively a top view and a side view of a third embodiment of an optical fiber tap according to the invention.

FIGS. 3C and 3D are respectively a top view and a side view of the optical fiber tap shown in FIGS. 3A and 3B with the branch optical fiber and the main optical fiber installed in the branch channel and the main channel respectively.

FIGS. 4A, 4B and 4C are respectively a top view, a side view and a cross-sectional view along the line 4C—4C in FIG. 4A of a fourth embodiment of an optical fiber tap according to the invention with its cover in a closed state.

FIGS. 4D, 4E and 4F are respectively a top view, a side view and a cross-sectional view along the line 4F—4F in FIG. 4D of the optical fiber tap shown in FIGS. 4A–4C with its cover in an open state.

FIGS. 5A, 5B, 5C, 5D and 5E are respectively a top view, a side view and cross-sectional views along the lines 5C—5C, 5D—5D and 5E—5E in FIG. 5A of the housing of the optical fiber tap shown in FIGS. 4A–4F with its cover in a closed state.

FIGS. 6A, 6B, 6C, 6D and 6E are respectively a top view, a side view and cross-sectional views along the lines 6C—6C, 6D—6D and 6E—6E in FIG. 6A of the body of the optical fiber tap shown in FIGS. 4A–4F.

FIGS. 7A, 7B, 7C, 7D and 7E are respectively a top view, a side view and cross-sectional views along the lines 7C—7C, 7D—7D and 7E—7E in FIG. 7A of the cover of the optical fiber tap shown in FIGS. 4A–4F.

FIGS. 8A, 8B and 8C are respectively a top view, a side view and a cross-sectional view along the line 8C—8C in FIG. 8A of the optical fiber tap shown in FIGS. 4A–4F with the main optical fiber inserted into the body prior to closing the cover.

FIGS. 8D, 8E and 8F are a respectively top view, a side view and a cross-sectional view along the line 8F—8F in FIG. 8D of the optical fiber tap shown in FIGS. 4A–4F with the main optical fiber inserted into the body and the cover closed.

FIG. 10A is an enlarged top view of part of a sixth embodiment of an optical fiber tap according to the invention with the branch optical fiber and the main optical fiber installed in the branch channel and the main channel, respectively.

FIG. 10B is an enlarged cross-sectional view along the line 10B—10B in FIG. 10A of the part of the optical fiber tap shown in FIG. 10A.

FIG. 11A is an enlarged top view of part of a seventh embodiment of an optical fiber tap according to the invention with the branch optical fiber and the main optical fiber installed in the branch channel and the main channel, respectively.

FIG. 11B is an enlarged cross-sectional view along the line 11B—11B in FIG. 11A of the part of the optical fiber tap shown in FIG. 11A.

DETAILED DESCRIPTION OF THE INVENTION

Figure 9A:
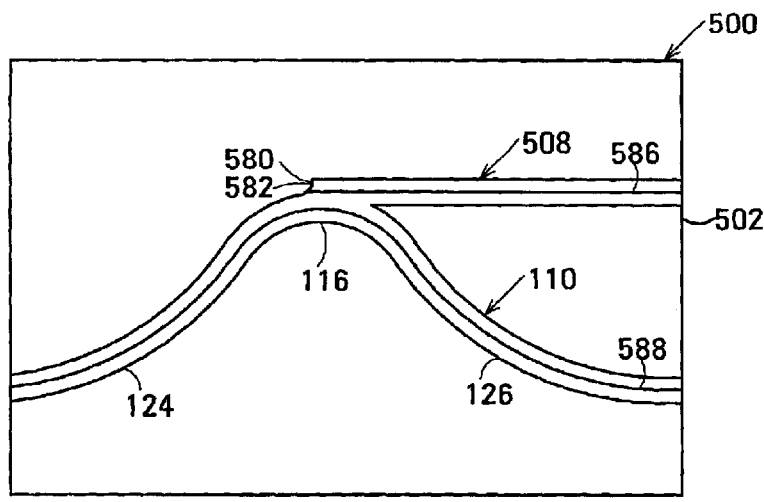
FIGS. 9A and 9B are respectively a top view and a side view of a fifth embodiment of an optical fiber tap according to the invention.

Bending an optical fiber lengthways into an arc having a radius less than a critical radius will allow light to pass laterally through the cladding of the optical fiber into and out of the core of the optical fiber, and will thus allow an optical signal to be coupled into and out of the optical fiber. A curved portion of an optical fiber having a radius of curvature less than the critical radius will be called a coupling curve.

The optical fiber tap according to the invention is composed of a housing, a serpentine main channel and a branch channel. Both the main channel and the branch channel are defined in the housing. The main channel is shaped to accommodate part of the main optical fiber, and includes a coupling curve portion that is shaped to define a coupling curve in the main optical fiber. The branch channel is shaped to accommodate part of the branch optical fiber and communicates with the main channel at the coupling curve portion of the main channel. Optical signals are coupled laterally between a portion of a main optical fiber installed in the main channel and a portion of a branch optical fiber installed in the branch channel where the main channel and the branch channel communicate.

FIGS. 1A and 1B are a top view and a side view, respectively, of a first embodiment 100 of an optical fiber tap according to the invention. In the first embodiment, the branch channel is also serpentine and includes a coupling curve portion opposed to and juxtaposed with the coupling curve portion of the main channel. The coupling curve portion of the branch channel defines a coupling curve in the branch optical fiber. Optical signals are coupled laterally between the juxtaposed coupling curves defined in the main optical fiber installed in the main channel and the branch optical fiber installed in the branch channel.

The optical fiber tap 100 is composed of the housing 102 that includes the body 130 and the lid 132. The branch channel 108 and the main channel 110 are defined in the housing, specifically in the body. In the example shown, the lid is transparent to enable the drawing to depict details of the channels and the optical fibers. In a practical embodiment, the lid would typically be opaque.

The branch channel 108 accommodates part of an optical fiber that will be called the branch optical fiber. Part of a branch optical fiber 104 is shown installed in the branch channel in FIGS. 1C and 1D. The branch channel is serpentine and includes the coupling curve portion 112 that extends over part of its length. The coupling curve portion 112 has a radius of curvature less than the critical radius of the branch optical fiber.

The main channel 110 accommodates part of an optical fiber that will be called the main optical fiber. Part of a main optical fiber 106 is shown installed in the main channel in FIGS. 1C and 1D. The main channel is serpentine and includes the coupling curve portion 116 that extends over part of its length. The coupling curve portion 116 has a radius of curvature less than the critical radius of the main optical fiber. The coupling curve portions 112 and 116 of the channels 108 and 110, respectively, curve in opposite directions and communicate over a short segment located substantially at their apices.

FIGS. 1C and 1D show the optical fiber tap 100 with part of the branch optical fiber 104 installed in the branch channel 108 and part of the main optical fiber 106 installed in the main channel 110. The coupling curve portion 112 of the branch channel forms the coupling curve 114 in the branch optical fiber. The coupling curve portion 116 of the main channel forms the coupling curve 118 in the main optical fiber. The coupling curve 118 formed in the main optical fiber is opposed to, and juxtaposed with, the coupling curve 114 formed in the branch optical fiber. The juxtaposed, opposed coupling curves enable optical signals to couple laterally between the main optical fiber and the branch optical fiber.

The part of the main optical fiber 106 installed in the main channel 110 can be located anywhere along the length of the main optical fiber. Moreover, the main optical fiber can be inserted into the main channel without the need for access to either of its ends. This allows the optical fiber tap 100 to be added to the main optical fiber without the need to disturb an existing installation of the main optical fiber.

The part of the branch optical fiber 104 installed in the branch channel 108 is located at one end of the branch optical fiber in this embodiment. In the example shown, the branch optical fiber is terminated by the anti-reflective termination 120. The optical fiber tap additionally includes the recess 119 defined in the body 130. The recess communicates with the branch channel and is shaped to accommodate the anti-reflective termination. In embodiments in which reflections at the end of the branch optical fiber are tolerable, the anti-reflection termination may be omitted from the branch optical fiber and the recess may be omitted from the body.

FIGS. 1A and 1B show the body 102 without optical fibers installed in the branch channel 108 and the main channel 110. The branch channel 108 is composed of the curved portion 122 arranged in tandem with the coupling curve portion 112, described above. The curved portion 122 curves in the opposite direction to the coupling curve portion 112. The main channel 110 includes, in order, the curved portion 124, the coupling curve portion 116, described above, and the curved portion 126 arranged in tandem. The curved portions 124 and 126 curve in the opposite direction to the coupling curve portion 116. Each of the curved portions 122, 124 and 126 has a radius of curvature greater than the critical radius of the optical fibers to minimize the loss of the optical signal from the parts of the optical fibers located in these portions of the channels.

The branch channel 108 and the main channel 110 have cross-sectional shapes and dimensions that define the location of the branch optical fiber 104 and the main optical fiber 106, respectively, in the housing 102. In the example shown, the channels each have a substantially V-shaped cross-sectional shape and are dimensioned to locate the surfaces of the branch optical fiber and the main optical fiber substantially flush with the major surface 128 of the body 130.

Alternatively, the channels may have cross-sectional shapes and dimensions that locate the branch optical fiber and the main optical fiber to project slightly above the major surface 128. Such projection enables the lid 132, to be described further below, installed on the body to clamp the optical fibers in the channels. The branch and main channels may alternatively have a U-shaped, semi-circular, semi-elliptical, parabolic, square or other suitable cross sectional shape, and may have cross-sectional shapes that differ from one another.

At their closest approach, the center lines of the branch channel 108 and the main channel 110 are separated by a distance equal to, or slightly less than, the sum of the radii of the branch optical fiber 104 and the main optical fiber 106. This arrangement brings the optical fibers into contact with one another in the contact region 136, shown in FIG. 1C and the cross-sectional view of FIG. 1E, where the lateral coupling of optical signals takes place.

The lid 132 is affixed to the body 130 to form the housing 102. In one embodiment, the lid is affixed to the body by a hinge (not shown). The hinge allows the lid to be opened to enable the optical fibers 104 and 106 to be installed in the channels 108 and 110, respectively, defined in the body. The lid 132 is held in its closed state by one or more latches (not shown).

In another embodiment, the lid 132 is affixed to the body 130 by latches (not shown) and is opened by releasing the latches to detach the lid from the body. In a further embodiment, the lid is supplied detached from the body. After the optical fibers 104 and 106 have been installed in the channels 108 and 110, respectively, the lid is affixed to the body using an adhesive or using fasteners, such as screws, rivets, clamps, etc.

The lid 132 is closed after the optical fibers 104 and 106 have been installed in the branch channel 108 and the main channel 110, respectively. In its closed state, the lid forces the optical fibers 104 and 106 into contact with the walls of the branch channel 108 and the main channel 110, respectively, to cause the coupling curve portions 112 and 116 of the channels to bend the optical fibers to form the coupling curves 114 and 118 and to define the juxtaposed location of the coupling curves.

Hinges, latches, adhesives, fasteners and other means suitable for affixing the lid 130 to the body 130 of the optical fiber tap 100 are known in the art, and therefore will not be described here.

In an alternative embodiment, the body 130 constitutes the entire housing 102, and the optical fibers 104 and 106 are retained in the branch channel 108 and the main channel 110, respectively, by means other than a lid. For example, the optical fibers may be retained in the serpentine channels by a suitable adhesive (not shown).

Instead of the lid 132, the optical fiber tap 100 may include a two-part lid similar to the two-part lid portion 232 to be described below with reference to FIGS. 2B and 2D. A two-part lid makes the optical fiber tap easier to install by enabling the optical fiber first installed in the optical fiber tap to be retained in its channel by its respective lid portion before the other optical fiber is installed.

The optical fiber tap 100 is made by molding the body 130 from a suitable plastic or other moldable material. Molding, as used herein, encompasses casting. The molding process additionally defines the branch channel 108 and the main channel 110 and, optionally, the recess 119 in the body. The lid 132 may also be molded from plastic or another moldable material. In an exemplary embodiment, the entire housing 102, composed of the body 130, the lid 132, one or more hinges (not shown) extending between the body and the lid, and one or more latches (not shown), is molded from plastic as an integral unit.

Alternatively, the body 130 and lid 132 may each be composed of a material such as a plastic, metal, semiconductor, glass or ceramic. The branch channel 108 and the main channel 110 and, optionally, the recess 119, may be formed in the body by removing material from the body by such processes as machining, wet or dry etching or erosion.

FIGS. 2A–2D show a second embodiment 200 of an optical fiber tap according to the invention. The optical fiber tap 200 additionally includes the branch optical fiber, one end of which is pre-installed in the branch channel and is retained therein by a lid portion that constitutes one part of a two-piece lid. As in the first embodiment, the branch channel is serpentine and includes a coupling curve portion opposed to and juxtaposed with the coupling curve portion of the main channel. The coupling curve portion of the branch channel defines a coupling curve in the branch optical fiber. Optical signals are coupled laterally between the juxtaposed coupling curves defined in the main optical fiber installed in the main channel and the branch optical fiber installed in the branch channel. Elements of the optical fiber tap 200 that correspond to elements of the optical fiber tap 100 described above with reference to FIGS. 1A–1E are indicated using the same reference numerals and will not be described again here.

The optical fiber tap 200 is composed of the housing 202 and the branch fiber 104. The housing 202 includes the body 130 and the two-piece lid 232, composed of the lid potions 234 and 236. The branch channel 108 and the main channel 110 are defined in the housing, specifically in the body.

The optical fiber tap 200 is supplied with the part of the branch optical fiber 104 and, optionally, the anti-reflection termination 120 factory-installed in the branch channel 108 and the recess 119, respectively, and retained therein by the lid portion 234 affixed to the body 130. The lid portion 234 covers only part of the major surface 128 of the body and leaves exposed the part of the body in which the main channel 110 is defined. The remaining lid portion 236 is used to cover the main channel 110 and retain the main optical fiber 106 therein after the optical fiber tap has been installed on the main optical fiber.

The optical fiber tap 200 is used by installing it on the main optical fiber 106 and optically connecting the end of the branch optical fiber 104 remote from the optical fiber tap 200 to an optical device (not shown). This establishes optical communication between the optical device and the main optical fiber. The optical fiber tap is installed on the main optical fiber 106 by inserting part of the main optical fiber 106 into the main channel 110. The lid portion 236 is then closed to retain the main optical fiber in the main channel 110. Installing the main optical fiber in the main channel and, specifically, in the coupling curve portion 116 forms the coupling curve 118 in the main optical fiber and establishes optical communication between the main optical fiber and the branch optical fiber via the coupling curves 114 and 118, as described above.

As described above with reference to the lid 132, the lid portions 234 and 236 may be independent of the body 130 and may be affixed to the body by an adhesive, by fasteners or by latches. Alternatively, either or both of the lid portions may be affixed to the body by respective hinges (not shown) and may be retained in their closed states by respective latches (not shown), fasteners, adhesive or in other ways.

The optical fiber tap 200 may be made by any of the processes described above. In an embodiment, the housing 202, composed of the body 130, the lid portions 234 and 236, hinges extending between the body and the lid portions and respective latches, are molded from plastic or another moldable material as an integral unit, in a manner similar to that described above.

FIGS. 3A–3D show a third embodiment 300 of an optical fiber tap according to the invention. The optical fiber tap 300 is capable of random placement along both the main optical fiber and the branch optical fiber. As in the first embodiment, the branch channel is serpentine and includes a coupling curve portion opposed to and juxtaposed with the coupling curve portion of the main channel. The coupling curve portion of the branch channel defines a coupling curve in the branch optical fiber. Optical signals are coupled laterally between the juxtaposed coupling curves defined in the main optical fiber installed in the main channel and the branch optical fiber installed in the branch channel. Elements of the optical fiber tap 300 that correspond to elements of the optical fiber tap 100 described above with reference to FIGS. 1A–1E are indicated using the same reference numerals and will not be described again here.

The optical fiber tap 300 is composed of the housing 302 that includes the body 330 and the lid 132. The branch channel 308 and the main channel 110 are defined in the housing, specifically in the body. In the example shown, the lid is transparent to enable the drawing to depict details of the channels and the optical fibers. In a practical embodiment, the lid would typically be opaque.

The branch channel 308 accommodates part of the branch optical fiber. The branch channel is shaped to be substantially a mirror image of the main channel 110. The branch channel 308 includes the curved portion 122, the coupling curve portion 112, both described above, and the curved portion 344, in order, arranged in tandem. The curved portion 344 curves in the opposite direction to the coupling curve portion 112. Each of the curved portions 122 and 344 has a radius of curvature greater than the critical radius of the branch optical fiber to minimize the loss of the optical signal from the part of the branch optical fiber located in these portions of the branch channel.

Similar to the main channel 110, the branch channel 308 extends across the entire width of the body 330 so that it can accommodate a part of the branch optical fiber 104 located anywhere along the length the branch optical fiber. Moreover, the branch optical fiber can be inserted into the branch channel without the need for access to either of its ends. This allows the optical fiber tap 300 to be installed on both the branch optical fiber and the main optical fiber 106 without the need to disturb an existing installation of either of the optical fibers, other than to bring them together at the optical fiber tap.

FIGS. 3C and 3D show the optical fiber tap 300 with part of the branch optical fiber 104 installed in the branch channel 308 and part of the main optical fiber 106 installed in the main channel 110. The coupling curve portion 112 of the branch channel forms the coupling curve 114 in the branch optical fiber. The coupling curve 114 formed in the branch optical fiber is opposed to, and juxtaposed with, the coupling curve 118 formed in the main optical fiber 106 by the main channel 110. The juxtaposed, opposed coupling curves enable optical signals to couple laterally between the main optical fiber and the branch optical fiber.

The optical fiber tap 300 includes the lid 132 that retains the branch optical fiber 104 and the main optical fiber 106 in the serpentine channels 308 and 110 respectively. The optical fiber tap 300 may alternatively include a two-part lid similar to the two-part lid 232 described above with reference to FIGS. 2B and 2D. A two-part lid makes the optical fiber tap 300 easier to install by enabling the optical fiber first installed in the optical fiber tap to be retained in its channel by its respective lid portion before the other optical fiber is installed.

The optical fiber tap 300 may be made by any of the processes described above. The optical fiber tap 300 is used in a manner similar to that described above with reference to FIGS. 1A–1E, except that the optical fiber tap 300 may be located anywhere along the length of the branch optical fiber 104.

In the embodiments of the optical fiber tap described above with reference to FIGS. 1A–1E, 2A–2D and 3A–3D, the branch channel and the main channel that accommodate the branch and main optical fibers, respectively, are defined in the body of the optical fiber tap. However, this is not critical to the invention. Only one of the channels may be defined in the body, and the other of the channels may be defined in the lid, or in one of the lid portions of a two-piece lid.

FIGS. 4A–4F show a fourth embodiment 400 of an optical fiber tap according to the invention. The optical fiber tap 400 is shown in its closed state in FIGS. 4A–4C and in its open state in FIGS. 4D–4F. The optical fiber tap 400 additionally includes the branch optical fiber, one end of which is pre-installed in a serpentine branch channel and is retained therein by a lid. The main optical fiber is installed in a straight loading path that exists in the optical fiber tap in its open state. A coupling curve, juxtaposed with the coupling curve defined in the branch optical fiber, is formed in the main optical fiber by closing the optical fiber tap. Optical signals are coupled laterally between the juxtaposed coupling curves defined in the main optical fiber and the branch optical fiber. Elements of the optical fiber tap 400 that correspond to the elements of the optical fiber tap 100 described above with reference to FIGS. 1A–1E are indicted using the same reference numerals and will not be described again here.

The optical fiber tap 400 is composed of the housing 402 that includes the body 430, the lid 432 and the movable cover 434. In the example shown, the movable cover 434 is pivotally attached to the body 430 by the pivot 465 and is retained in its closed state by the latch 466. Also in the example shown, the optical fiber tap additionally includes the branch fiber 104, part of which is installed in the serpentine branch channel 408 defined in the body 430. The branch optical fiber is retained in the branch channel 408 by the lid 432.

The cover 434 is pivotably movable about the pivot 465 between the closed state shown in FIG. 4A and the open state shown in FIG. 4D to enable the optical fiber tap 400 to be easily installed on the main optical fiber. The optical fiber tap can be installed on the main optical fiber at any point along the main optical fiber without the need to have access to a free end of the main optical fiber. As will be described in more detail below, the optical fiber tap is installed on the main optical fiber by pivoting the cover to its open state, placing the main optical fiber in the straight loading path 478 defined in the body 430 and pivoting the cover to its closed state. The act of closing the cover forms the serpentine main channel 410 that includes the coupling curve portion 116. Formation of the coupling curve portion 116 forms a coupling curve in the main optical fiber and juxtaposes the coupling curve in the main optical fiber with the coupling curve 114 formed in the branch optical fiber 104 by the branch channel 408. Thus, in this embodiment, the main channel is defined in the body and the cover, collectively.

FIGS. 5A and 5B are respectively a top view and a side view of the housing 402 and FIGS. 5C, 5D and 5E are cross-sectional views of the housing along the lines 5C—5C, 5D—5D and 5E—5E, respectively, in FIG. 5A. FIGS. 6A and 6B are respectively a top view and a side view of the body 430 and FIGS. 6C, 6D and 6E are cross-sectional views of the body along the lines 6C—6C, 6D—6D and 6E—6E, respectively, in FIG. 6A. FIGS. 7A and 7B are respectively a top view and a side view of the cover 434 and FIGS. 7C, 7D and 7E are cross-sectional views of the cover along the lines 7C—7C, 7D—7D and 7E—7E, respectively, in FIG. 7A.

Referring now to FIGS. 6A–6E, and additionally to FIG. 4A, the branch channel 408 is defined in the body 430. The branch channel 408 accommodates part of the branch optical fiber 104. The branch channel is serpentine and includes the coupling curve portion 112. The coupling curve portion 112 has a radius of curvature less than the critical radius of the branch optical fiber. The coupling curve portion 112 forms the coupling curve 114 in the branch optical fiber 104. In the example shown, the branch channel 408 has a square cross-sectional shape with dimensions that closely match the diameter of the branch optical fiber. However, this is not critical to the invention. The branch channel 408 may have another cross-sectional shape capable of positively defining the location of the branch optical fiber in the housing 402. For example, the branch channel may have the substantially V-shaped cross-sectional shape shown in FIG. 1B.

The part of the branch optical fiber 104 located in the branch channel 408 is retained therein by the lid 432 and the cover 434. The portion of the branch optical fiber that constitutes the coupling curve 114 is retained in the branch channel 408 by the cover 434 in its closed state. The branch optical fiber is shown terminated in the anti-reflective termination 120.

The body 430 additionally defines the recess 119 that communicates with the branch channel 408 and accommodates the anti-reflective termination. In embodiments in which reflections at the end of the branch optical fiber are tolerable, the anti-reflection termination may be omitted from the branch optical fiber and the recess may be omitted from the body 430.

The body 430 is shaped to include the raised regions 462, 469, 476 and 477 that extend in the z-direction from the internal surface 472 of the body, as shown in FIGS. 6A–6E. The raised regions are indicated by shading in FIG. 6A for clarity. The raised region 462 is part of the pivot 465. The raised regions 476 and 477 define the ends of the loading path 478 and the raised region 477 additionally forms part of the latch 466. The perimeter of the raised region 469 facing into the body is indicated at 468 and forms one side wall of the main channel 410, as will be described in more detail below.

Turning now to FIGS. 7A–7E, the cover 434 is shaped to define the hole 463 that engages with the raised region 462 formed in the body 430 to form the pivot 465. The cover is additionally shaped to include the raised region 471 that extends in the −z-direction from the internal surface 473 of the cover. The raised region is indicated by shading in FIG. 7A. A part 464 of the raised region 471 is shaped to engage with the raised region 477 formed in the body to form the latch 466. The inside-facing perimeter of the raised region 471 is indicated at 470.

The perimeters 468 and 470 of the raised regions 469 and 471, respectively, are located opposite one another when the body 430 and the cover 434 are assembled, and the cover is in its closed state, as shown in FIGS. 5A and 5C–5E. The opposed perimeters 468 and 470 collectively provide the side walls of the main channel 410 that accommodates the main optical fiber 106. The top and bottom walls of the main channel are provided by part of the internal surface 472 of the body 430 (FIG. 6C) and by part of the internal surface 473 of the cover 434 (FIG. 7C), respectively. The walls of the main channel are shown in FIG. 5D. Thus, in this embodiment, the main channel 410 is defined by the body and the cover collectively.

The pivot 465 is formed by the raised portion 462 defined in the body 430 and the hole 463 defined in cover 434. The pivot permits the cover to rotate relative to the body, and additionally prevents the cover from moving in the z-direction relative to the body. The latch 466 is formed by the raised portion 477 defined in the body and the part 464 of the raised portion 471 defined in the cover. The latch retains the cover in its closed state. The pivot and the latch are shown as being integral with the body and the cover. However, separate components attached to the body and the cover may be used as either or both of the pivot and the latch.

FIG. 6A shows the alignment guides 474 and 475 additionally defined in the body 430. The alignment guides constitute opposite ends of the main channel 410 and facilitate installation of the main optical fiber into the optical fiber tap 400. The alignment guides are the only parts of the main channel 410 whose side walls exist when the cover 432 is in its open state. The alignment guide 474 is a short, open channel portion bounded on one side by the raised region 469, on another, opposite, side by the raised region 476 and on a third, orthogonal, side by the internal surface 472 of the body. The alignment guide 475 is a short, open channel portion bounded on one side by the raised region 469, on another, opposite, side by the raised region 477 and on a third, orthogonal, side by the internal surface 472. When the cover 434 is in its open state, the alignment guides define the opposite ends of the loading path 478 that extends in a straight line through the body. The main optical fiber is inserted into the loading path during installation of the optical fiber tap on the main optical fiber, as will be described in more detail below with reference to FIG. 8A.

The optical fiber tap 400 is made by molding the body 430 from a suitable plastic or other moldable material. The molding process additionally defines the raised regions 462, 469, 476 and 477, the branch channel 408 and the optional recess 119 in the body. The lid 432 may also be molded from plastic or another moldable material. In an exemplary embodiment, the body 430, the lid 432, a hinge (not shown) extending between the body and the lid, a latch (not shown) for the lid are molded from plastic as an integral unit. The cover 434 is also molded from a suitable plastic or another moldable material. The molding process additionally defines the raised region 471 and the hole 463.

Alternatively, the body 430, the lid 432 and the cover 434 may each be composed of a material such as a plastic, metal, semiconductor, glass or ceramic. Portions of these materials are removed by such processes as machining, wet or dry etching or erosion to define the raised regions in the body and the cover and the branch channel 408 and the optional recess 119 in the body. Alternatively, piece parts may be assembled to form the body and the cover that include the raised regions and to form the body that includes the branch channel and the optional recess. Other suitable manufacturing processes may alternatively be used.

Operation of the optical fiber tap 400 will now be described with reference to FIGS. 8A–8F. In the example shown, the branch optical fiber 104 is factory installed in the branch channel 408 and is retained therein by the lid 432 affixed to the body 430.

To install the optical fiber tap 400 on the main optical fiber 106 to establish optical communication between the main optical fiber and the branch optical fiber 104, the cover 434 is pivoted about the pivot 465 to its open state, shown in FIGS. 8A–8C. The cover 434 in its open state reveals the loading path 478 that extends in a straight line through the body 430 between the alignment guides 474 and 475. The main optical fiber 106 is inserted into the alignment guides, which align the main optical fiber along the loading path 478. The main optical fiber is inserted into the loading path without the need to bend or otherwise shape the main optical fiber, and without the need to have access to either end of the main optical fiber. This makes it relatively easy to insert the main optical fiber into the body.

Closing the cover 434 by rotating it counterclockwise about the pivot 465 brings the perimeter 470 of the raised region 471 of the cover into contact with the main optical fiber 106. Further rotation of the cover causes the perimeter 470 and the perimeter 468 of the raised region 469 of the body 430 to form the serpentine main path 410, including the coupling portion 116. Moreover, rotation of the cover to its closed state automatically bends the main optical fiber to conform to the main path. Conforming to the coupling curve portion 116 of the main path defines the coupling curve 118 in the main optical fiber. Finally, rotation of the cover to its closed state automatically juxtaposes the coupling curve 118 with the coupling curve 114 formed in the branch optical fiber 104 by the branch channel 108. The juxtaposed coupling curves enable lateral coupling of optical signals between the main optical fiber 106 and the branch optical fiber 104. In its closed state, the cover 434 retains the main optical fiber in the main channel 410. The latch 466 retains the cover in the closed state.

The end of the branch optical fiber 104 remote from the anti-reflective termination 120 is connected to an optical device (not shown). This establishes optical communication between the main optical fiber 106 and the optical device.

In the example just described, the optical fiber tap 400 is supplied with the end part of the branch optical fiber 104 factory-installed in the branch channel 408, and with the branch optical fiber terminated by the anti-reflective termination 120. The lid 432 is installed in the factory to retain the branch optical fiber in the branch channel 408. As noted above, the anti-reflection termination is optional and may be omitted in certain applications. The optical fiber tap 400 may alternatively be supplied with no branch optical fiber installed in the branch channel 408. In this case, one end of the optical fiber 104 is field installed in the branch channel 408 and the lid 432 is affixed to the body 430 to retain the branch optical fiber in the branch channel 408. This may be done before or after installing the fiber optical tap 400 on the main optical fiber 106.

In another alternative embodiment of the optical fiber tap 400, the branch channel 408 is shaped similarly to the branch channel 308 described above with reference to FIG. 3A. This makes the optical fiber tap 400 capable of random placement along the both the main optical fiber and the branch optical fiber, as described above with reference to FIGS. 3A–3D.

The movable cover 434 may be attached to the body 430 by means other than the pivot 465. For example, movable cover may be attached to the body by a pivot located on the right-hand side of the body. In another example, the movable cover is slidably attached to the body. The body is furnished with rails that retain and guide the cover in a manner that enables the cover to move in the y-direction shown in FIG. 6A. Sliding the cover in the −y-direction relative to the body opens the cover to reveal the loading path 478 and the alignment guides 474 and 475. The main optical fiber 106 is inserted into the loading path. Closing the cover closed by sliding the cover in the +y-direction brings the perimeter 470 of the raised region 471 of the cover into contact with the main optical fiber 106. Further sliding of the cover causes the perimeter 470 and the perimeter 468 of the raised region 469 of the body 430 to establish the main path 410 that automatically bends the main optical fiber to form the coupling curve 118.

The lid 432 may be fully detachable from the body 430 or may attached to the body by a hinge, as described above. However, this is not critical to the invention. Instead of the lid 432, the optical fiber tap 400 may include a second movable cover similar to the movable cover 434. The second movable cover would move pivotably, slidably or in another way to reveal a straight loading path into which the branch optical fiber is inserted. Closing the second movable cover would then define the coupling curve 114 in the branch optical fiber. The movable cover 434 and the second movable cover can have different modes of movement.

The second movable cover would be shaped to include a raised region similar to the raised region 471 with a perimeter that would be substantially a mirror image of at least part of the perimeter 470 of the cover 434. The raised region 469 of the body would be additionally shaped to include a second perimeter that would be substantially a mirror image of at least part of the perimeter 468. The body would also be shaped to include additional raised regions similar to the raised regions 476 and 477. The additional raised regions, together with the raised region 469, would form alignment channels similar to the alignment channels 474 and 475, but located at opposite ends of the branch channel 408.

With the arrangement just described, the branch channel 408 would be bounded on opposite sides by the perimeter of the raised region of the second movable cover and the second perimeter of the raised region 469 of the body. A second movable cover would enable the branch optical fiber to be easily installed in the housing and would allow the coupling curve 114 to be automatically formed in the branch optical fiber simply by closing the second cover. The second movable cover would operate on the branch optical fiber in a manner similar to the way in which the movable cover 434 is described above as operating on the main optical fiber. The branch optical fiber could pass through the housing, in a manner similar to that shown in FIG. 3A, or could terminate in the housing, as shown in FIG. 4A.

The optical fiber tap 400 has been described above with reference to an example in which the branch channel 408 that accommodates the branch optical fiber 104 is defined in the body 430. However, this is not critical to the invention. The branch channel 408 may alternatively be defined in the lid 432.

In another variation, the depth of the optical fiber tap 400 in the z-direction is increased to allow the main channel 408 to be dimensioned accommodate multiple branch optical fibers arrayed in the z-direction and to allow the main channel 410 to be dimensioned to accommodate multiple main optical fibers, also arrayed in the z-direction. Such an embodiment would enable the optical fiber tap to couple optical signals between all or selected ones of the optical fibers constituting a main and a branch fiber optic ribbon cable.

Figure 9B:
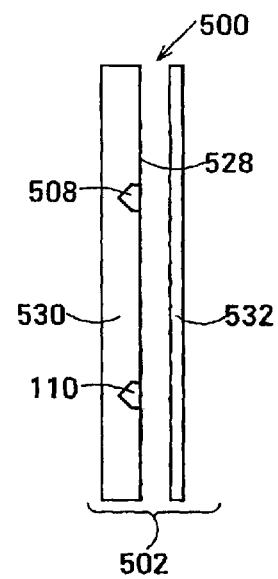
Figure 9C:
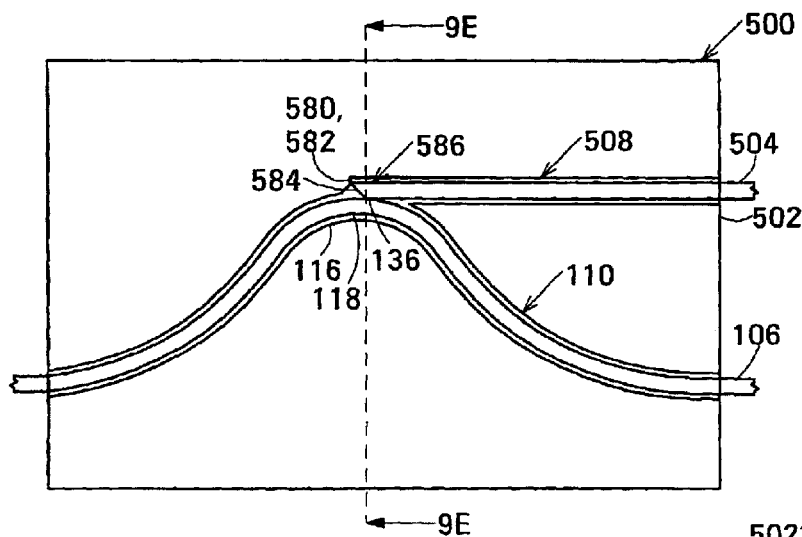
FIGS. 9C and 9D are respectively a top view and a side view of the optical fiber tap shown in FIGS. 9A and 9B with the branch optical fiber and the main optical fiber installed in the branch channel and the main channel, respectively.
Figures 9D, 9E:
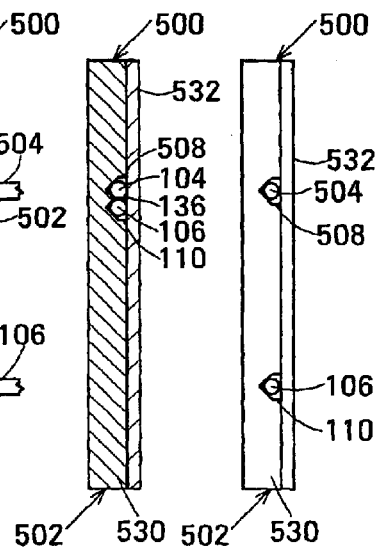
FIG. 9E is a cross-sectional view along the line 9E—9E in FIG. 9C of the optical fiber tap shown in FIGS. 9C and 9D.
Figure 9F:
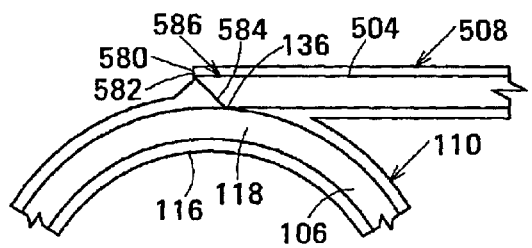
FIG. 9F is an enlarged view of the optical fiber tap shown in FIG. 9C showing the contact region where the optical fibers are juxtaposed.

FIGS. 9A and 9B are a top view and a side view, respectively, of a fifth embodiment 500 of an optical fiber tap according to the invention. In the optical fiber tap 500, only the main channel is serpentine. The branch channel is shaped to accommodate part of the branch optical fiber and communicates with the main channel at the coupling curve portion of the main channel. The branch channel includes an end-stop located at the coupling curve portion of the main channel. The end stop locates the end of the branch optical fiber at the coupling curve portion of the main channel. Optical signals are coupled laterally between the coupling curve defined in the main optical fiber installed in the main channel and the end of the branch optical fiber installed in the branch channel and juxtaposed with the coupling curve.

In the example shown, the branch channel is substantially straight. It is easier to install the branch optical fiber in a branch channel that is straight than in the serpentine branch optical channels of the embodiments described above. Additionally, a branch channel that is straight minimizes undesired loss of the optical signal from the branch optical fiber.

The example of the optical fiber tap 500 to be described in detail below is based on the optical fiber tap 100 described above with reference to FIGS. 1A–1E. Elements of the optical fiber tap 500 that correspond to elements of the optical fiber tap 100 are indicated by the same reference numerals and will not be described again here. The optical fiber taps 200 and 400 described above with reference to FIGS. 2A–2D and 4A–4F, respectively, may be similarly modified to incorporate a branch channel that includes an end-stop that locates one end of the branch optical fiber at the coupling curve portion of the main channel.

Turning now to FIGS. 9A and 9B, and additionally to FIGS. 9C–9F that show the optical fiber tap 500 with part of the branch optical fiber and part of the main optical fiber installed, the optical fiber tap 500 is composed of the housing 502 composed of the body 530 and the lid 532. The branch channel 508 and the main channel 110 are defined in the housing. In the example shown, the branch channel and the main channel are defined in the body. Also in the example shown, the lid is transparent to enable the drawing to depict details of the channels and the optical fibers. In a practical embodiment, the lid would typically be opaque.

The main channel 110 accommodates part of the main optical fiber 106. The main channel is serpentine and includes the coupling curve portion 116. The coupling curve portion 116 has a radius of curvature less than the critical radius of the main optical fiber.

The branch channel 508 accommodates part of the branch optical fiber 504. The branch channel communicates with the main channel 110 at the coupling curve portion 116 of the main channel. The branch channel includes the end-stop 580 located at the coupling curve portion 116 of the main channel. In the example shown, the end wall 582 of the branch channel serves as the end stop. Alternatively, the end stop may be independent of the end wall of the branch channel.

The branch optical fiber 504 is installed in the branch channel 508 with its end surface 584 abutting the end stop 580. This locates the end surface 584 of the branch optical fiber in a position relative to the main channel 110 in which the lateral coupling of optical signals between the main optical fiber 106 and the branch optical fiber is maximized. Alternatively, the end stop may locate the end surface 584 relative to the main channel in a position in which the lateral coupling not a maximum, but is greater than a specified minimum. In the example shown, the end stop locates the end surface of the branch optical fiber at the point of closest approach between the center line 586 of the branch channel 508 and the center line 588 of the main channel 110. This position corresponds approximately to the position of maximum lateral signal coupling. Lateral signal coupling less than the maximum but greater than a specified minimum will be obtained with the position of the end stop differing from the position shown by plus or minus several degrees along the arc of the main channel.

In the example shown, the branch channel 508 extends from the main channel 110 in a straight line. As noted above, a branch channel that is straight makes it easier to install the branch optical fiber 504 in the branch channel and reduces unwanted loss of the optical signal from the branch optical fiber. However, this is not critical to the invention: the branch channel may alternatively be curved.

In the example shown, the branch channel 508 extends substantially tangentially from the coupling curve portion 116 of the main channel 110. The extension is substantially tangential in the sense that a line parallel to, and laterally offset from, the center line 586 of the branch channel is tangential to the center line 588 of the main channel 110 in the coupling curve portion 116. The substantially tangential arrangement shown maximizes the lateral coupling of optical signals between the main and branch optical fibers. The branch channel may alternatively extend from the coupling curve portion of the main channel at an acute angle to a tangent to the center line 588.

In the example shown, the branch channel 508 extends from the main channel 110 at a point corresponding to the maximum deviation of the main channel in the y-direction. Alternatively, the branch channel may extend from the main channel at a point in the coupling curve portion 116 angularly separated from the point shown along the arc of the coupling curve portion.

FIGS. 9C–9F show the optical fiber tap 500 with part of the branch optical fiber 504 installed in the branch channel 508 and part of the main optical fiber 106 installed in the main channel 110. The coupling curve portion 116 of the main channel 110 defines the coupling curve 118 in the main optical fiber. The branch channel juxtaposes one end 586 of the branch optical fiber with the coupling curve 118 formed in the main optical fiber and abutting the end surface 584 of the branch optical fiber with the end wall 582 of the branch channel locates the end surface 584 at the coupling curve. The end portion 586 of the branch optical fiber contacts the main optical fiber 110 in the contact region 136. Such contact is permitted by the branch channel communicating with the main channel, as described above. Optical signals couple laterally between the juxtaposed portions of the main optical fiber and the branch optical fiber.

At their closest approach, the center line 586 of the branch channel 508 and the center line 588 of the main channel 110 are separated by a distance equal to, or slightly less than, the sum of the radii of the branch optical fiber 504 and the main optical fiber 106. This arrangement of the channels brings the end 586 of the branch optical fiber into contact with the coupling curve 118 of the main optical fiber 106 in the contact region 136, shown in FIG. 9C, in the cross-sectional view of FIG. 9E and in the enlarged view of FIG. 9F. The above-mentioned lateral coupling of optical signals takes place in the contact region.

In the example shown, the end surface 584 of the branch optical fiber 504 is cut non-orthogonally to the longitudinal axis of the fiber to form a facet that faces the main channel 110. The facet increases the lateral coupling of optical signals compared to an end surface angled orthogonally to the longitudinal axis of the fiber.

The lid 532 is affixed to the body 530 to form the housing 502. In one embodiment, the lid is affixed to the body by a hinge (not shown). The hinge allows the lid to be opened to enable the branch optical fiber 504 and the main optical fiber 106 to be installed in the branch channel 108 and the main channel 110, respectively. The lid 532 is held in its closed state by one or more latches (not shown).

In another embodiment, the lid 532 is affixed to the body 530 by latches (not shown) and is opened by releasing the latches to detach the lid from the body. In a further embodiment, the lid is supplied detached from the body. After the optical fibers 504 and 106 have been installed in the channels 508 and 110, respectively, the lid is affixed to the body using a suitable adhesive.

The lid 532 is closed after the optical fibers 504 and 106 have been installed in the branch channel 508 and the main channel 110, respectively. In its closed state, the lid forces the optical fibers 504 and 106 into contact with the walls of the channels 508 and 110, respectively. This forms the coupling curve 118 in the main optical fiber and locates the end surface 584 of the branch optical fiber at the coupling curve in the main optical fiber. Friction between the branch optical fiber and the branch channel retains the branch optical fiber in the branch channel. An adhesive or other means may additionally or alternatively be used to retain the branch optical fiber in the branch channel.

Hinges, latches, adhesives and other means suitable for affixing the lid 532 to the body 530 of the optical fiber tap 500 are known in the art, and therefore will not be described here.

In an alternative embodiment, the body 530 constitutes the entire housing 502, and the optical fibers 504 and 106 are retained in the branch channel 508 and the main channel 110 by means other than a lid. For example, the optical fibers may be retained in the channels by a suitable adhesive (not shown).

Instead of the lid 532, the optical fiber tap 500 may include a two-part lid similar to the two-part lid portion 232 to be described below with reference to FIGS. 2B and 2D. A two-part lid makes the optical fiber tap easier to install by enabling the optical fiber first installed in the optical fiber tap to be retained in its channel by its respective lid portion before the other optical fiber is installed in the optical fiber tap.

The optical fiber tap 500 may be made by any of the processes described above with reference to FIGS. 1A–1E, and is used in a manner similar to that described above with reference to FIGS. 1A–1E.

FIGS. 10A and 10B are a top view and a cross-sectional view shown part of a sixth embodiment 600 of an optical fiber tap according to the invention. The Figures show only the part of the optical fiber tap 600 in the vicinity of the contact region 636 where the branch optical fiber 604 and the main optical fiber 606 are juxtaposed. In the optical fiber tap 600, the lateral coupling of optical signals between the main optical fiber and the branch optical fiber is increased by either or both the branch optical fiber and the main optical fiber including a region of reduced cladding thickness. In the region of reduced cladding thickness, the thickness of the cladding of the optical fiber is less than over the remainder of the length of the optical fiber. The region of reduced cladding thickness is juxtaposed with the other optical fiber in the contact region 636. The example of the optical fiber tap 600 shown is based the optical fiber tap 100 described above with reference to FIGS. 1A–1E. The optical fiber taps described above with reference to FIGS. 2A–2D, 3A–3D, 4A–4D and 9A–9E may be similarly modified. Elements of the optical fiber tap 600 that correspond to elements of the optical fiber tap 100 described above with reference to FIGS. 1A–1E are indicated using the same reference numerals and will not be described again here.

The optical fiber tap 600 is composed of a housing that includes the body 630 and the lid 632. Alternatively, the lid may be similar to the lid 232 described above with reference to FIGS. 2A–2D. In the example shown, the lid is transparent to enable the drawing to depict details of the channels and the optical fibers. In a practical embodiment, the lid would typically be opaque.

The branch channel 108 and the main channel 110 are defined in the housing. In the example shown, the branch channel and the main channel are defined in the body 630. The location of at least one of the channels in the body is shifted in the y-direction relative to the corresponding channel of the optical fiber tap described above with reference to FIGS. 1A–1E. The shift in the channel position enables the optical fibers located in the channels to contact one another notwithstanding at least one of the optical fibers including a region of reduced cladding thickness. Specifically, the distance between center lines in the coupling curve portions 112 and 116 of the channels is reduced by an amount corresponding to the total reduction in the thickness of the cladding of the optical fibers.

The optical fiber tap 600 is shown with the branch optical fiber 604 installed in the branch channel 108 and the main optical fiber 606 installed in the main channel 110. In the example shown, the branch optical fiber includes the region 692 of reduced cladding thickness in which the thickness of the cladding of the branch optical fiber is reduced and the main optical fiber includes the region 694 of reduced cladding thickness in which the thickness of the cladding of the main optical fiber is reduced. Techniques for forming an optical fiber to include a region of reduced cladding thickness or for forming a region of reduced cladding thickness in an existing optical fiber are known.

The branch optical fiber 604 and the main optical fiber 606 are installed in the branch channel 108 and the main channel 110, respectively, such that the regions 692 and 694 of reduced cladding thickness are juxtaposed in the contact region 636. In an embodiment, such as in the example shown, in which the reduction in the cladding thickness is rotationally asymmetrical about the core of the optical fiber, the optical fibers are installed with a rotational orientation about their respective cores that puts the regions 692 and 694 of reduced cladding thickness in contact with one another as shown.

Instead of both the branch optical fiber and the main optical fiber including regions of reduced cladding thickness, only one of the optical fibers may include a region of reduced cladding thickness. For example, in an embodiment of the optical fiber tap 600 based on the optical fiber tap 200 described above with reference to FIGS. 2A–2D, in which the optical fiber tap 200 is supplied with the branch optical fiber factory-installed, the distance between the center lines of the branch channel and the main channel may be reduced as described above and the branch optical fiber may include a region of reduced cladding thickness over the portion of its length that corresponds to the coupling curve 114. The branch optical fiber is factory installed in the branch channel 108 with the region of reduced cladding thickness facing the main channel 110. The main optical fiber 106 is then installed in the main channel 110. A version of the optical fiber tap 600, in which only the branch optical fiber includes a region of reduced cladding thickness, provides an increased lateral coupling of optical signals between the main optical fiber and the branch optical fiber with a conventional main optical fiber that lacks a region of reduced cladding thickness.

In an embodiment of the optical fiber tap 600 based on the optical fiber tap 500 described above with reference to FIGS. 9A–9E, the spacing between the center lines of the branch channel and the main channel is reduced as described above, and the branch optical fiber 504 includes a region of reduced cladding thickness. The region of reduced cladding thickness extends from the end surface 584 along a short portion of the length of the branch optical fiber. The branch optical fiber is installed in the branch channel 508 with the region of reduced cladding thickness facing the main channel 110.

The main optical fiber 606 may be a special optical fiber that includes regions of reduced cladding thickness located at intervals along its length. Each of the regions is similar to the region 694 of reduced cladding thickness. Such main optical fiber is installed in the main channel 110 of the optical fiber tap 600 with one of the regions of reduced cladding thickness located in the contact region 136 and facing the branch channel 108, 308 or 508. Alternatively, the main optical fiber may be a conventional optical fiber that is field modified to form the region 694 of reduced cladding thickness located at the point along the length of the main optical fiber where the optical fiber tap 600 will be installed.

FIGS. 11A and 11B show part of a seventh embodiment 700 of an optical fiber tap according to the invention. The Figures show only the part of the optical fiber tap 700 in the vicinity of the contact region 136 where the branch optical fiber 104 and the main optical fiber 106 are juxtaposed. In the optical fiber tap 700, the lateral coupling of optical signals between the main optical fiber and the branch optical fiber is increased by a coupling material located adjacent the contact region 136 where the branch optical fiber and the main optical fiber are juxtaposed. The example of the optical fiber tap 700 shown is based the optical fiber tap 100 described above with reference to FIGS. 1A–1E. The optical fiber taps described above with reference to FIGS. 2A–2D, 3A–3D, 4A–4D, 9A–9E and 11A–11C may be similarly modified. Elements of the optical fiber tap 700 that correspond to elements of the optical fiber tap 100 described above with reference to FIGS. 1A–1E are indicated using the same reference numerals and will not be described again here.

The optical fiber tap 700 additionally includes the coupling material 796 that fills the gap between the branch optical fiber 104 and the main optical fiber 106 over part of the lengths of the optical fibers extending in at least one direction from the contact region 136. The coupling material increases the lateral coupling of optical signals between the branch optical fiber and the main optical fiber. The coupling material is transparent in the wavelength range of the optical signals carried by the optical fibers.

In one embodiment, the coupling material 796 has a refractive index substantially equal to that of the cladding of the optical fibers 104 and 106. In another embodiment, the coupling material has a refractive index intermediate between that of air and that of the cladding of the optical fibers 104 and 106.

In an embodiment, the coupling material 796 is a liquid, and remains a liquid through the service life of the optical fiber tap 700. In another embodiment, the coupling material is a liquid capable of being cured to form a solid. In an embodiment in which the contact material remains a liquid, the contact material has a low volatility, and a viscosity and surface tension that are a compromise between the contact material easily filling the gap between the optical fibers during installation and the contact material remaining in the gap through the service life of the optical fiber tap. In an embodiment in which the contact material is a curable liquid, the coupling material in its liquid form has a low viscosity and a low surface tension to enable it to easily fill the gap between the optical fibers. Once installed in the gap, the coupling material is cured by heat, electromagnetic radiation, such as UV light, a chemical reaction or otherwise. This enables the coupling material to remain in the gap through the service life of the optical fiber tap.

The coupling material 796 in its liquid form is placed in the gap between the optical fibers after the branch optical fiber and the main optical fiber have been installed in the branch channel 108 and the main channel 110. Alternatively, the liquid coupling material may be placed in the region where the branch channel 108 and the main channel 110 communicate before the optical fibers 104 and 106 are installed. As a further alternative, one of the optical fibers is installed in its channel, the liquid coupling material applied to the portion of the installed optical fiber located in the region where the channels communicate, and the other of the optical fibers is installed in its channel.

In another embodiment, the coupling material 796 is a deformable solid, such as a wax. The coupling material is initially located between the portions of the optical fibers 104 and 106 located in the region where the branch channel 108 and the main channel 110 communicate. The coupling material may initially separate the optical fibers. Affixing the lid 132 to the body 130 centers the optical fibers 104 and 106 in their respective channels 108 and 110, as described above. This moves the optical fibers laterally towards one another and into contact with one another. The lateral movement of the optical fibers deforms the coupling material until the coupling material fills the gap between the optical fibers.

Heat- or UV-curable optical epoxies with appropriate indices of refraction can be used as the coupling material 796. Thermoplastic materials, widely used to attach fiber optic connectors to optical fibers, may alternatively be used as the coupling material. Such materials are pliable when heated and set in their final configuration upon cooling. Methacrylate or similar esters with appropriate UV-activated catalysts will form acrylic polymers on exposure to UV light and can be used as the coupling material. All of the above materials are available from 3M Company and from other suppliers.

This disclosure describes the invention in detail using illustrative embodiments. However, it is to be understood that the invention defined by the appended claims is not limited to the precise embodiments described.

We claim:

1. An optical fiber tap for establishing optical communication between a branch optical fiber and a main optical fiber, the optical fiber tap being capable of random placement along the main optical fiber, the optical fiber tap comprising:

a housing;

a serpentine main channel defined in the housing and shaped to accommodate part of the main optical fiber, the main channel including a coupling curve portion shaped to define a main coupling curve in the main optical fiber; and a branch channel defined in the housing and shaped to accommodate part of the branch optical fiber, the branch channel communicating with the main channel at the coupling curve portion of the main channel in which:

the housing comprises:
a body in which the main channel and the branch channel are defined, and
a lid affixable to the body to retain the optical fibers in the channels.

2. The optical fiber tap of claim 1 in which the branch channel is serpentine and includes a coupling curve portion opposed to and juxtaposed with the coupling curve portion of the main channel.

3. The optical fiber tap of claim 2, additionally comprising the branch optical fiber, the branch optical fiber including part installed in the serpentine branch channel.

4. The optical fiber tap of claim 3, in which:
the part of the branch optical fiber accommodated in the branch channel includes an end; and
the optical fiber tap additionally comprises an anti-reflection termination at the end of the branch optical fiber.

5. The optical fiber tap of claim 4, additionally comprising a recess defined in the housing to accommodate the anti-reflection termination.

6. The optical fiber tap of claim 1 in which the branch channel includes an end-stop located adjacent the coupling curve portion of the main channel.

7. The optical fiber tap of claim 6, in which the branch channel is substantially straight.

8. The optical fiber tap of claim 6, in which the branch channel is oriented substantially tangentially to the coupling curve portion of the main channel.

9. The optical fiber tap off claim 6, additionally comprising the branch optical fiber, branch optical fiber including a part installed in the branch channel and an end surface abutting the end-stop.

10. The optical fiber tap of claim 9, in which the end surface of the branch optical fiber is non-orthogonal to a longitudinal axis of the branch optical fiber.

11. The optical fiber tap of claim 1, additionally comprising means for increasing lateral coupling of optical signals between the branch optical fiber and the main optical fiber.

12. The optical fiber tap of claim 11, in which the means for increasing includes a region of reduced cladding thickness in at least one of the branch optical fiber and the main optical fiber.

13. The optical fiber tap of claim 11, in which the means for increasing includes a coupling material disposed between branch optical fiber and the main optical fiber.

14. The optical fiber tap of claim 1 in which the lid comprises:
a first lid portion affixable to the body to retain the branch optical fiber in the branch channel; and
a second lid portion affixable to the body to retain the main optical fiber in the main channel.

15. The optical fiber tap of claim 14, additionally comprising a hinge affixing one of the lid portions to the body.

16. The optical fiber tap of claim 1, additionally comprising a hinge affixing the lid to the body.

17. The optical fiber tap of claim 1, additionally comprising a latch retaining the lid in a closed state.

18. The optical fiber tap of claim 1, additionally comprising a latch retaining one of the lid portions in a closed state.

19. The optical fiber tap of claim 1, in which the branch channel is serpentine and extends through the housing to allow random placement of the optical fiber tap along the branch optical fiber.

20. A optical fiber tap for establishing optical communication between a branch optical fiber and a main optical fiber, the optical fiber tap being capable of random placement along the main optical fiber, the optical fiber tap comprising:

a housing;
a serpentine main channel defined in the housing and shaped to accommodate part of the main optical fiber, the main channel including a coupling curve portion shaped to define a main coupling curve in the main optical fiber; and
a branch channel defined in the housing and shaped to accommodate part of the branch optical fiber, the branch channel communicating with the main channel at the coupling curve portion of the main channel, in which:

the housing comprises:
a body in which a first side wall of the serpentine main channel is defined, and
a cover in which a second side wall, opposite the first side wall, of the serpentine main channel is defined, the cover being movably attached to the body and capable of being moved to a closed state in which the serpentine main channel is formed and the coupling curve is formed in the main optical fiber.

21. The optical fiber tap of claim 20, in which the cover is pivotably attached to the body.

22. The optical fiber tap of claim 20, in which the cover is slidably attached to the body.

23. The optical fiber tap of claim 20, in which:
the branch channel is defined in the body; and
the housing additionally comprises a lid attachable to the body to retain the branch optical fiber in the branch channel.

24. The optical fiber tap of claim 20, in which the housing additionally includes a lid attachable to the body and having the branch channel defined therein.

25. A optical fiber tap for establishing optical communication between a branch optical fiber and a main optical fiber, the optical fiber tap being capable of random placement along the main optical fiber, the optical fiber tap comprising:

a housing;
a serpentine main channel defined in the housing and shaped to accommodate part of the main optical fiber, the main channel including a coupling curve portion shaped to define a main coupling curve in the main optical fiber; and
a branch channel defined in the housing a shaped to accommodate part of the branch optical fiber, the branch channel communicating with the main channel at the coupling curve portion of the main channel, in which:

the housing comprises:
a body, and
a lid attachable to the body and having one of the main channel and the branch channel defined therein.

* * * * *